(12) United States Patent
Lin

(10) Patent No.: US 11,172,062 B2
(45) Date of Patent: Nov. 9, 2021

(54) PACKET IDENTIFYING METHOD AND PACKET IDENTIFYING DEVICE

(71) Applicant: PEGATRON CORPORATION, Taipei (TW)

(72) Inventor: Chiang-Wei Lin, Taipei (TW)

(73) Assignee: PEGATRON CORPORATION, Aipei (TW)

( * ) Notice: Subject to any disclaimer, the term of this patent is extended or adjusted under 35 U.S.C. 154(b) by 158 days.

(21) Appl. No.: 16/292,436

(22) Filed: Mar. 5, 2019

(65) Prior Publication Data

US 2019/0297185 A1  Sep. 26, 2019

(30) Foreign Application Priority Data

Mar. 21, 2018 (TW) ................. 107109728

(51) Int. Cl.
*H04M 3/28* (2006.01)
*G06F 16/2455* (2019.01)
*H04L 12/26* (2006.01)
*H04L 29/06* (2006.01)

(52) U.S. Cl.
CPC ........ *H04M 3/28* (2013.01); *G06F 16/24558* (2019.01); *H04L 43/04* (2013.01); *H04L 43/50* (2013.01); *H04L 65/1043* (2013.01)

(58) Field of Classification Search
CPC .... H04M 3/28; G06F 16/24558; H04L 43/04; H04L 43/50; H04L 65/1043
See application file for complete search history.

(56) References Cited

U.S. PATENT DOCUMENTS

| | | | |
|---|---|---|---|
| 8,473,519 B1* | 6/2013 | Siddiqui | H04L 41/0856 707/791 |
| 8,717,942 B2 | 5/2014 | Du et al. | |
| 2005/0160175 A1* | 7/2005 | Ho | H04L 12/66 709/228 |
| 2007/0225984 A1* | 9/2007 | Milstein | G10L 25/48 704/270 |
| 2014/0297817 A1* | 10/2014 | Thikkalveettil | H04L 67/306 709/220 |
| 2017/0237762 A1* | 8/2017 | Ogawa | H04L 63/1441 726/23 |
| 2018/0309617 A1* | 10/2018 | Xiao | H04L 12/4633 |
| 2019/0361643 A1* | 11/2019 | Tsuji | H04N 1/00204 |

FOREIGN PATENT DOCUMENTS

| | | |
|---|---|---|
| CN | 101938765 A | 1/2011 |
| TW | I428780 B | 3/2014 |
| TW | I466501 B | 12/2014 |

\* cited by examiner

*Primary Examiner* — Luat Phung
(74) *Attorney, Agent, or Firm* — McClure, Qualey & Rodack, LLP

(57) ABSTRACT

A packet identifying method includes: connecting to an IP telephone device under test and querying to a current device information of the IP telephone device under test; determining if there is any instruction set in a database matched with the current device information, wherein the database includes a plurality of instruction sets, and each instruction set corresponds to existing device information of an IP telephone device; and executing a packet identifying procedure by using an executing instruction set.

11 Claims, 8 Drawing Sheets

PACKET IDENTIFYING METHOD AND PACKET IDENTIFYING DEVICE

CROSS-REFERENCE TO RELATED APPLICATION

This non-provisional application claims priority under 35 U.S.C. § 119(a) to Patent Application No. 107109728 filed in Taiwan, R.O.C. on Mar. 21, 2018, the entire contents of which are hereby incorporated by reference.

BACKGROUND

Technical Field

The instant disclosure relates to a packet identifying method and a packet identifying device for network telephonies.

Related Art

Internet phones transmit signal between telephony devices and a softswitch by using Voice over Internet Protocol (VoIP), such as Media Gateway Control Protocol (MGCP), Session Initiation Protocol (SIP), and H.248.

Taking MGCP as an example, it implements the media gateway control protocol architecture for controlling media gateways on Internet Protocol (IP) networks connected to the public switched telephone network. For example, when one traditional telephony device (such as a cell phone or a local phone) is connected to one Internet telephony device (such as a cable modem which supports the Internet phone call), a main telephone exchange controls and transmits communication between the two devices. Each one telephony device is disposed with a media gateway (MG) used for controlling the communications (such as converting analog signals to digital signals) between the traditional telephony device and the Internet telephony device. The main telephone exchange is disposed with a media gateway controller (MGC), alternatively called as a call agent (CA), used for controlling communications between every two media gateways and transmitting signals from every gateway.

When the cable modem cannot connect to the traditional telephony device, it requires a maintenance man to remotely connect to a login port of the cable modem. Furthermore, it requires the maintenance man obtaining multiple voice packets abstracted from a set-top box according to an instruction set provided by a set-top box manufacturer. Then, the maintenance man may analyze corresponded logs of the voice packets, such as logs format, connection status and parameters, logs monitored by the MGC between two MGs, etc., for users to read, and so as to build a call flow for MGC and MGs.

However, there are many different manufacturers for MGs and MGC, and different set-top boxes may have different brands or models with different log format. It costs man power and time to capture the log of the coding from huge voice packets.

SUMMARY

Accordingly, the instant disclosure provides a packet identifying method and a packet identifying device for parsing a log format of the voice packets automatically. The packet identifying method is used for one or more IP telephone devices. Each IP telephone device has existing device information, each existing device information corresponds to an instruction set, and each instruction set is stored in a database of a packet identifying device. The packet identifying method comprises: connecting to IP telephone device under test and querying current device information of the IP telephone device under test; determining if there is any instruction set in the database conformed with the current device information; executing a packet identifying procedure by an executing instruction set when the determination is "yes", wherein the conformed instruction set is as the executing instruction set; and comparing the current device information with the existing device information for finding at least one matched parameter when the determination is "no", wherein the instruction sets corresponding to the at least one matched parameter are used as the executing instruction set for executing the packet identifying procedure, and wherein the at least one matched parameter comprises at least one of hardware information and software information.

In some embodiments, the packet identifying method comprises: building a database having a plurality of instruction set, and each instruction set corresponds to existing device information of the IP telephone device; connecting to an IP telephone device and querying current device information of the IP telephone device; determining if there is any instruction set in the database conformed with the current device information; and executing a packet identifying procedure by using an executing instruction set. If the instruction set is conformed with the current device information, the conformed instruction set is used as the executing instruction set. If the instruction set is not conformed with the current device information, the current device information is compared with the existing device information for finding at least one matched parameter, and the instruction set(s) corresponding to the at least one matched parameter are used as the executing instruction set.

The instant disclosure also provides a packet identifying device used for one or more IP telephone device. Each existing IP telephone device corresponds to an instruction set, and each instruction set corresponds to existing device information, wherein the existing device information comprises hardware information, software information, and a combination of hardware information and software information. The packet identifying device comprises a communication interface and a packet identifying module. The communication interface receives current device information and a plurality of the instruction set. The packet identifying module determines if there is any instruction set conformed with one of the plurality of the existing device information, wherein if the determination is "yes", the conformed instruction set is used as an executing instruction set for executing a packet identifying procedure; and if the determination is "no", the current device information is compared with the existing device information for finding at least one matched parameter in the plurality of the instruction sets, wherein the plurality of the instruction sets corresponding to the at least one matched parameter are used as the executing instruction set for executing the packet identifying procedure.

DETAIL DESCRIPTION OF THE EMBODIMENTS

Figure 1:
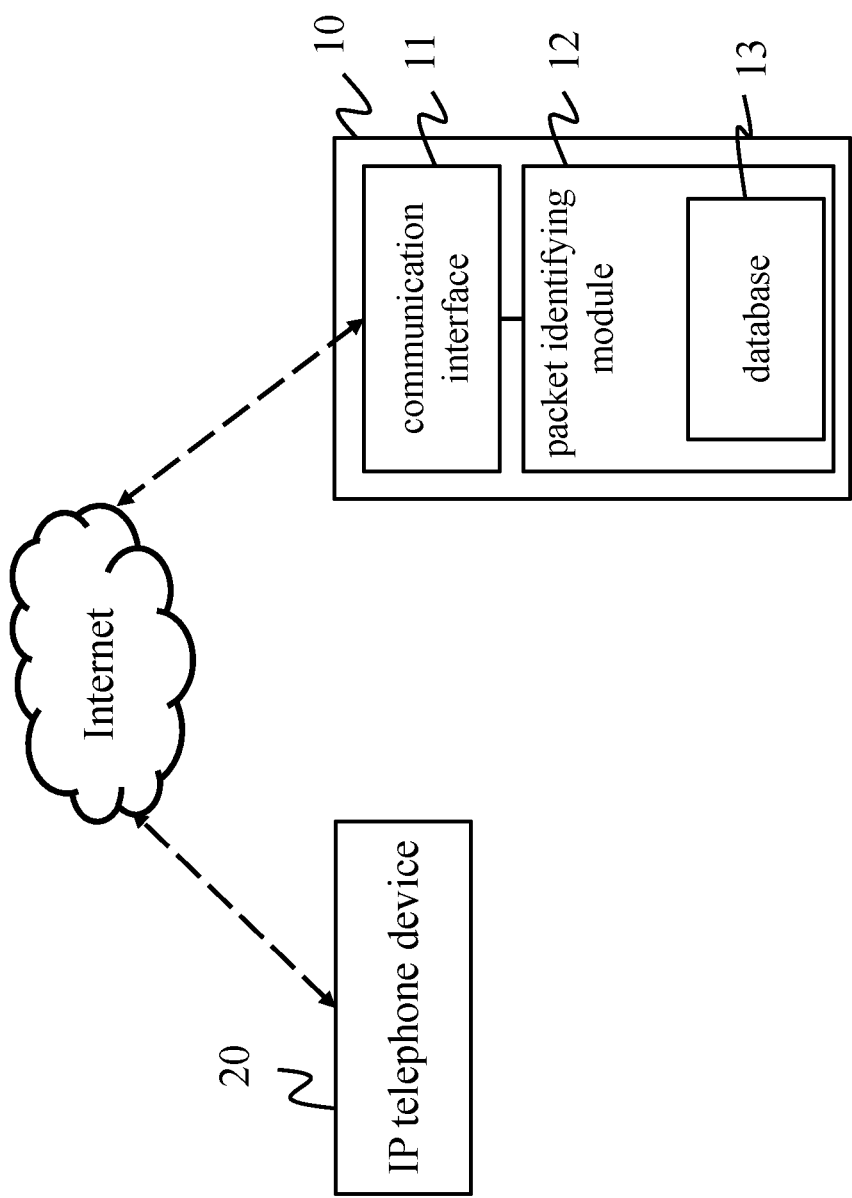
FIG. 1 is a packet identifying device when in use according to an embodiment of the present disclosure.

Refer to FIG. 1, which shows a packet identifying device 10 including a communication interface 11 and a packet identifying module 12 coupling to the communication interface 11. The communication interface 11 may remotely login an IP telephone device 20 via Internet. The packet identifying module 12 may inquire a combination of multiple device information of the IP telephone device 20 through the communication interface 11. The combination of multiple device information of the IP telephone device 20 will be called as "current device information". The current device information includes one or more parameters such as hardware information, software information, or combination information of the hardware and the software. The hardware information may be a chipset model or a chipset manufacturer code, etc. The software information may be firmware version, software version, or kit version, etc. The firmware version refers to the version of the firmware embedded in the IP telephone device 20. The software version refers to the version of the software executed by the IP telephone device 20. The kit version refers to the version of the program used in the software. The program may be developed by another company. The software may use the program for executing one or more function, such as adding new function, disabling or enabling a part of sub-function of the function, or revising a part of sub-function of the function. For example, a cable modem may be provided with functions of data transmission, call communication or execution application driven by one or more chipset(s). The call communication function may be achieved by inserting a call program (module) in software. Furthermore, it may add new function by updating the call kit version. For example, the call communication function may be added with video function or higher resolution after updating the version of the call program.

The packet identifying device 10 may be, for example, a host computer, a server, a server array, or a distributed architecture server. The communication interface 11 may be a wireless interface connected by mobile communication technology (such as Global System for Mobile Communications (GSM)/Universal Packet Radio Service (GPRS), 3G, 4G, 5G or the like), Wi-Fi supported communication technology, regional wireless communication technology (such as Bluetooth). Alternatively, the communication interface 11 may be a wired interface, such as an Ethernet interface, a USB interface, a High Definition Multimedia Interface (HDMI), or Motion High Quality Link (MHL) interface. The packet identifying module 12 may be a computing unit such as a central processing unit, a microprocessor, or an application-specific integrated circuit (ASIC), which may execute a specific program. The packet identifying method described below may be executed by the packet identifying module 12.

Figure 2:
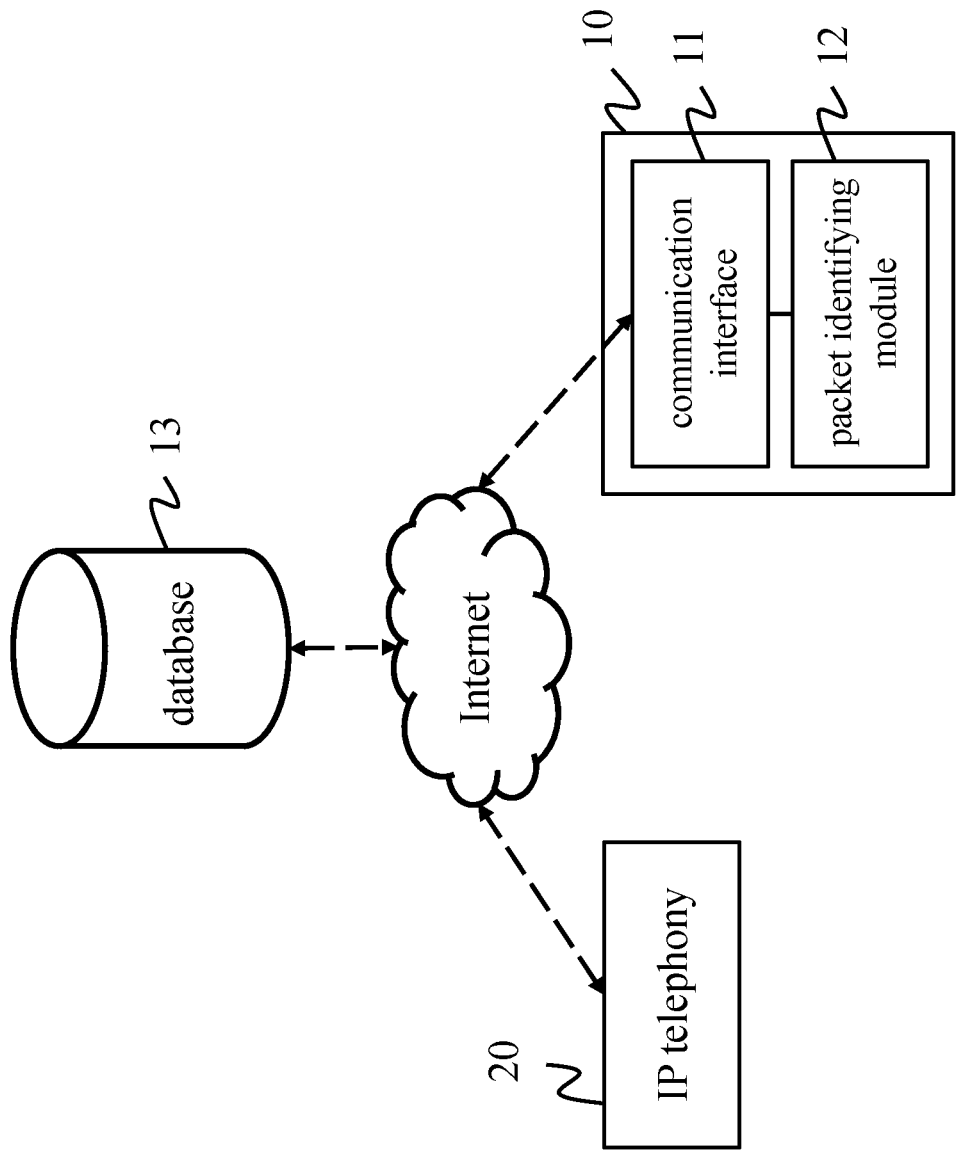
FIG. 2 is a packet identifying device when in use according to another embodiment of the present disclosure.

In some embodiments, the packet identifying module 12 includes a storage embedded in the computing unit or the externally connected (such as electrically connected) to the computing unit for storing the program executed by the computing unit. For example, the storage may be a storage unit such as a non-volatile memory or a hard disk. Furthermore, the storage may store with a database 13 including a plurality of instruction set, and each instruction set corresponds to one or more existing device information of different brand(s) or different model(s) of the IP telephone device 20. That is, each existing device information of the IP telephone device 20 corresponds to one instruction set. Different existing device information of the IP telephone device 20 may corresponds to the same or different instruction set. The existing device information may be hardware or software information of the IP telephone device 20, as described above of the parameters of the current device information. In some embodiments, as shown in FIG. 2, the packet identifying device 10 may connect to the Internet through the communication interface 11 and connect to the database 13 through the Internet. In other words, the database 13 may be stored in a cloud server. The communication interface 11 of the packet identifying device 10 may connect to the cloud server through the Internet and access the instruction sets stored in the database 13. The instruction sets may be stored in the storage or in the database by local operating the packet identifying device 10. The instruction sets may be transmitted by a remote device (such as a desk top computer, a laptop computer, a smart phone, a PAD, etc.), received by the communication interface 11 of the packet identifying device 10, and stored in the storage or in the database 13.

Figure 3:
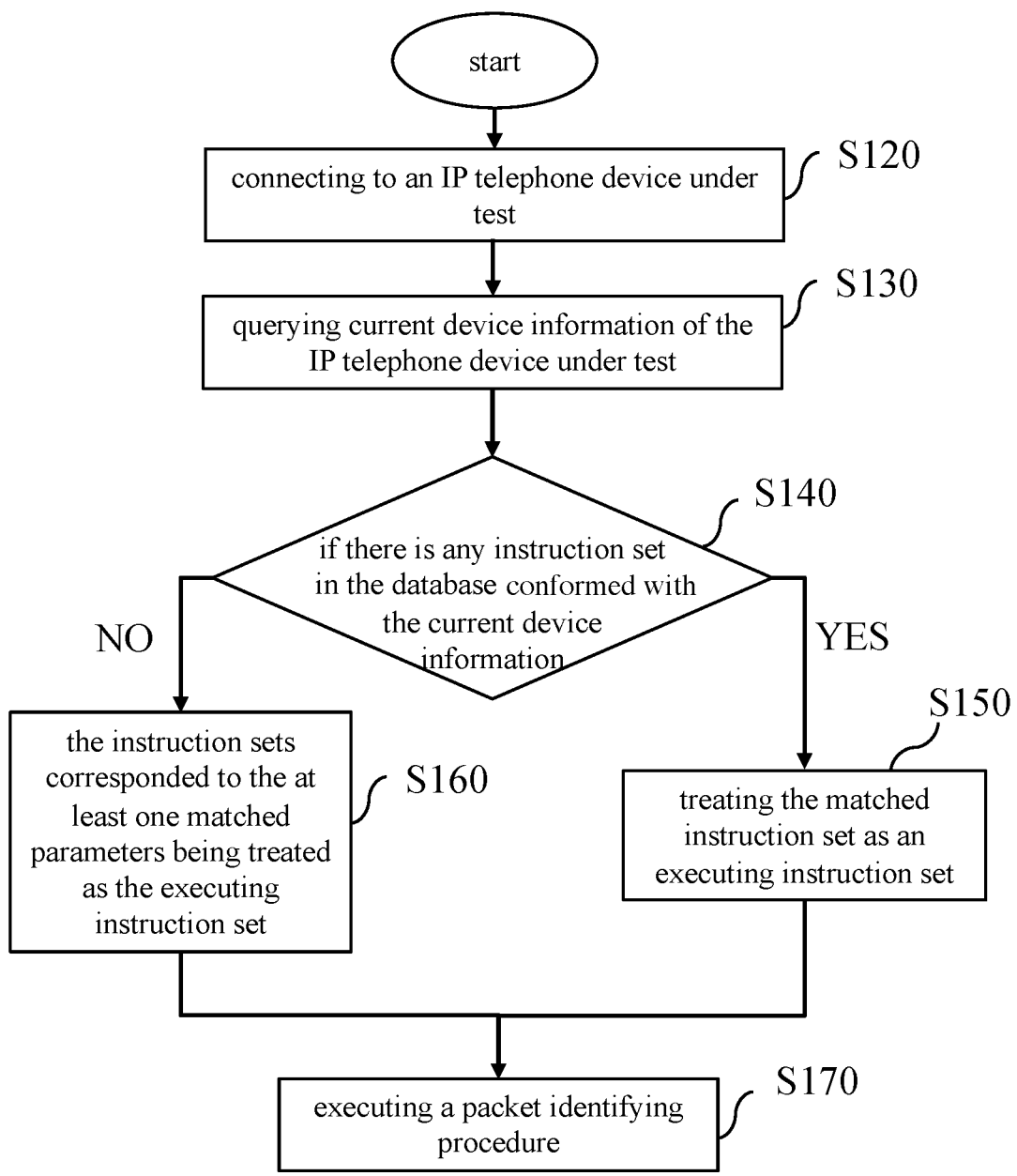
FIGS. 3-7 are flow charts of a packet identifying method according to an embodiment of the present disclosure.

Please refer to FIG. 1 to FIG. 3. FIG. 3 is a flow chart (1) of a packet identifying method according to a first embodiment of the present disclosure. Before executing the first embodiment of the packet identifying method, the packet identifying module 12 may pre-setup a database 13. The database 13 includes a plurality of instruction set, and each instruction set corresponds to existing device information of one or more IP telephone device 20. The packet identifying module 12 may be accompanied with the database 13 so as to execute the packet identifying method of the present disclosure. Details will be described in below.

First, as shown in step S120, the packet identifying device 10 connects to a IP telephone device under test 20 via the communication interface 11, such as one or more MG or one or more MGC.

Then as shown in FIG. 3, the flow comes to step S130: querying current device information of the IP telephone device under test 20.

The flow then comes to step S140: determining if there is any instruction set in the database conformed with the current device information (i.e., determining if there is any existing device information corresponding to the instruction set matched with the current device information). The definition of "match" may be varied according to different requirement. For example, if the existing device information is identical to the current device information, the determination of the match is "same". According to different parameters, it may add with different weight for the determination. For those with larger weights, it has more same parameters, and which means it match the determination. Alternatively, in some embodiment, when there is at least one same parameter, it may match the determination. Addition to the determination of the match, comparison of the parameters may further determine the similarity. When the parameters are similar, it may match the determination.

After accessing the database 13, it executes a packet identifying procedure by an executing instruction set. When the determination is "YES" in step 140, the flow comes to step S150: treating the conformed instruction set as an executing instruction set. Then the flow comes to step S170: executing the packet identifying procedure by the executing instruction set. In this case, the existing device information is same as the current device information. If there is no conformed instruction set, it compares the current device information and the existing device information, so as to find at least one matched parameters (such as a manufacturer code of chipset). Corresponding to the at least one matched parameters, the instruction sets are used as the executing instruction set, as shown in step 160. Then the flow comes to step S170: executing a packet identifying procedure by the executing instruction set. In this case, the at least one matched parameters means that at least one parameter in the current device information is same as in the existing device information. Alternatively, a weight may be used to the comparison for the parameters. When the weight is greater, the comparison is matched with more same parameters. For example, at least one parameter in the current device information is same as in the existing device information. The instruction set corresponding to the matched parameter may be found and treated as the executing instruction set.

If there is any conformed instruction set in the database 13, the IP telephone device 20 will be determined by the packet identifying module 12 that the call function is unchanged. And, the current device information will be marked. If there is no conformed instruction set in the database 13, the IP telephone device 20 will be determined by the packet identifying module 12 that the call function is changed. When there is no conformed instruction set in the database 13, it determines if there is one or more call instruction in the executing instruction set for executing the packet identifying procedure. If there is a call instruction executing the packet identifying procedure unsuccessfully, the call instruction will be marked. The packet identifying module 12 revises the marked call instruction to be successfully executing. The revised and marked call instruction is corresponded to the IP telephone device 20. Furthermore, the packet identifying module 12 may define a hierarchy between the instruction sets according to the revised and marked call instruction. A revised character or symbol in the call instructions may be collected for its order or position. A subset may be built for those revised characters or symbols having the same characters or symbols. A cluster may be generated by sorting a plurality of subset hierarchy according to numbers, orders, or positions of those same characters or symbols. In other words, the packet identifying module 12 may preset accessing or revising the executing instruction set in the cluster according to the marked call instruction.

The word, "revise", in this disclosure may refer to rearrange or recombine an instruction. Rearranging the instruction means rearranging strings in the instruction. For example, it may add or delete one or more spaces, underscores, slashes, quotations, exclamations, dash lines, etc. between strings. Alternatively, it may add, delete, or replace one or more characters. Recombining the instruction means recombining strings in the instruction. For example, one or more character or symbol is moved forward or backward for one or more position.

The executing instruction set is a set of one or more instruction in the instruction set for executing the packet identifying procedure. For example, the instruction may be call instructions of opening, capturing, connecting, filtering, or parsing. Taking MGCP as an example, the instruction may be "endpoint configuration", "notification request", "notify", "create connection", etc. Further taking "notification request" as an example, "notification request" means when an event occurs, a MGC instructs the MG sends a "notification" to the MGC. For example, when the MG receives a "notification request" instruction for a "Hook Off" event on an end point (such as a cable modem), the MG is required to send a "notify" to the MGC when the event is occurred.

In one embodiment, the packet identifying module 12 may collect the revised order or position of the character or symbol in the call instructions according to a course of revising one or more call instruction of the executing instruction set, so as to build a cluster having hierarchy between the unchanged call instruction and the changed call instruction. In other words, a hierarchy may be included between a sub-database of the unchanged call instruction and the changed call instruction. According to a marked existing parameter, the packet identifying module 12 may access a sub-database corresponding to the marked existing parameter and the corresponded executing instruction set, so as to build the executing instruction set corresponding to the current device information of the IP telephone device 20. Furthermore, in all sub-database having a hierarchy relation, the marked existing parameter also has a hierarchy relation. Furthermore, the packet identifying module 12 may build a hierarchy relation for each marked existing parameter according to numbers, orders, or positions of the revised characters or symbols, so as to create a cluster. When the packet identifying module 12 connects to the IP telephone device 20, according to the current device information of the IP telephone device 20 and the marked existing parameter, it accesses the cluster corresponding to the marked parameter. Next, in the cluster, the executing instruction set of each sub-database is used to execute the packet identifying procedure, such as revising one or more call instruction in the executing instruction sets to execute the packet identifying procedure. If the revised executing instruction set executes the packet identifying procedure successfully, the packet identifying module 12 may access the sub-database corresponding to the current device information of the IP telephone device 20 according to the marked and revised executing instruction set.

In one embodiment, a sub-database in the database 13 includes the revised existing parameter and the revised or replaced executing instruction sets. The packet identifying module 12 may collect the unchanged character or symbol in the call instructions according to a course of revising one or more call instruction of the executing instruction set, so as to build key strings from the unchanged character or symbol in the call instructions. According to the key strings, one or more instruction is used as the executing instruction set, so as to execute the packet identifying procedure. Furthermore, the packet identifying module 12 may build one or more sub-database corresponding to the executing instruction set according to the key strings. Each sub-database corresponds to each marked existing parameter. Furthermore, a hierarchy relation may be included between sub-databases, so as to build a cluster.

Figure 4:
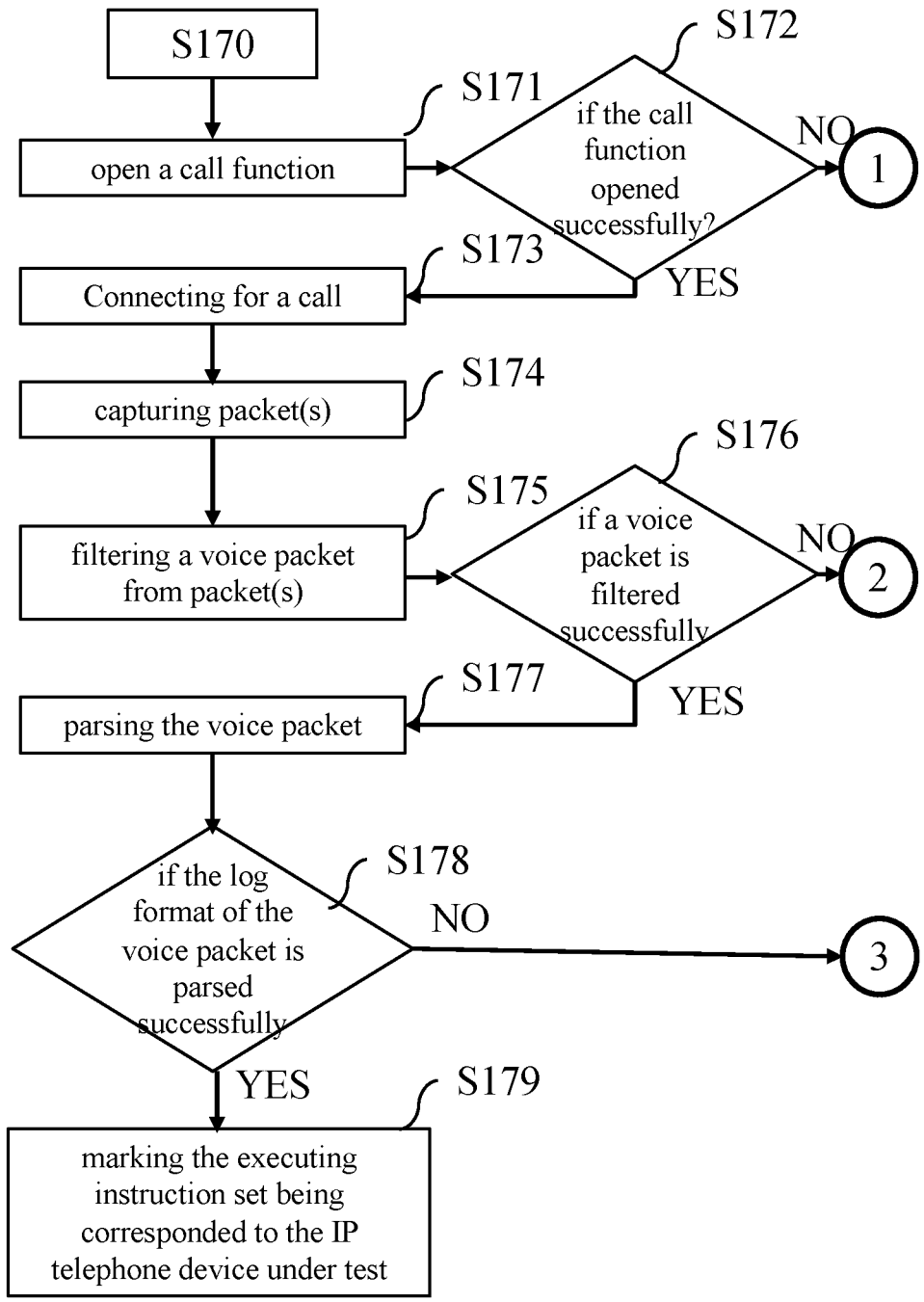

Please see FIG. 3 and FIG. 4. FIG. 4 is a flow chart (2) of a packet identifying method according to a first embodiment of the present disclosure. The flow chart (2) adds step(s) based on the first embodiment. Below will describe for the difference, and the same step(s) will be omitted.

The packet identifying procedure includes call instructions, such as instruction of opening, capturing, connecting, filtering, or parsing. First, the opening instruction may be used to open a call function of the IP telephone device 20, as shown in step S171. Then the flow comes to step S172: determining if the call function of the IP telephone device 20 opened successfully? If the determination is "YES", then the flow comes to step S173: connecting the IP telephone device 20 to a call communication by using the instruction of connecting. If the determination is "NO", then the packet identifying module 12 keeps opening the call function of the IP telephone device 20, which will be described in below. Then the flow comes to step S174: capturing one or more packet in a call communication by using the instruction of capturing. Each packet may include a plurality of coding log for the call communication and a plurality of instructions. Taking a log content in the MGCP as an example, one or more packet captured from a cable modem may be displayed as "15:35:56.680 05/15/2017 [HGCP] (DNS) INFO: dnsLookupHostsByName called for pol-agcf01.ims.claro.com.pe . . . 15:35:56.680 05/15/2017 [HGCP] (DNS) INFO: dnsLookupHostsByName( ) called for pol-agcf01.ims.claro.com.pe . . . [HRGW] (NCS) DBG: CRCX 549347506 aaln/1@mta-bcd165283958.ims.claro.com.pe MGCP 1.0 NCS 1.0 C: 7abb720b L:a:G729; telephone-event,mp: 20-M:inactive X: 8b0a8a6a R:S:".

After step S174, the flow comes to step S175: filtering a voice packet (such as a MGCP log) from one or more packet by using the instruction of filtering. Taking a log content in the MGCP as an example, it may be displayed as "[HRGW] (NCS) DBG: CRCX 549347506 aaln/1@mta-bcd165283958.ims.claro.com.pe MGCP 1.0 NCS 1.0 C:7abb720b L:a:G729; telephone-event,mp:20;-M:inactive X:8b0a8a6a R: S:".

Please see FIG. 4. The flow comes to step S176: determining if a voice packet is filtered from one or more packet successfully? If the determination is "YES", then the flow comes to step S177: parsing the voice packet for its log format by using the instruction of parsing. If the determination is "NO", then the packet identifying module 12 keeps parsing a voice packet from one or more packet, which will be described in below. The log format of the voice packet in a call communication may be varied according different manufacturer or model of different MG or MGC. For example, the log format may include an arrangement format or a coding format, etc. Then, next comes to step S178: determining if the log format of the voice packet is parsed successfully? If the determination is "YES", then the log format of the voice packet may be interpreted as a readable message for users. If the determination is "NO", the packet identifying module 12 keeps parsing the log format of the voice packet, which will be described in below. Taking a log in a MGCP as an example, "CRCX 549347506 aaln/1@mta-bcd165283958.ims.claro.com.pe MGCP 1.0 NCS 1.0", the log content will be "log name: CRCX", "serial number: 549347506", "endpoint ID: aaln/1@mta-bcd165283958.ims.claro.com.pe", and "protocol: MGCP 1.0 NCS 1.0". And the log content of "C:7abb720b" will be "Call ID number: 7abb720b". The log content of "L:a:G729; telephone-event,mp:20" will be "Local connection option: adapting G0.729".

After successfully parsing the log format of the voice packet, the flow comes to step S179: marking (or determining) the executing instruction set in the database 13 being corresponded to the IP telephone device under test 20. In other words, the marked executing instruction set corresponds to the IP telephone device under test 20, that is, the call function of the IP telephone device 20 for test is unchanged and the log format of the voice packet is parsed successfully.

There are some determinations with "NO" in FIG. 4 for the packet identifying procedure, which will be described in below accompanying with FIG. 5-FIG. 7. Furthermore, the call instructions (instruction of opening, capturing, connecting, filtering, or parsing) marked with executing the packet identifying procedure unsuccessfully in the database 13 are marked as changed call instruction and revised the call instructions, so as to execute the packet identifying procedure successfully and to save the revised call instructions.

Figure 5:
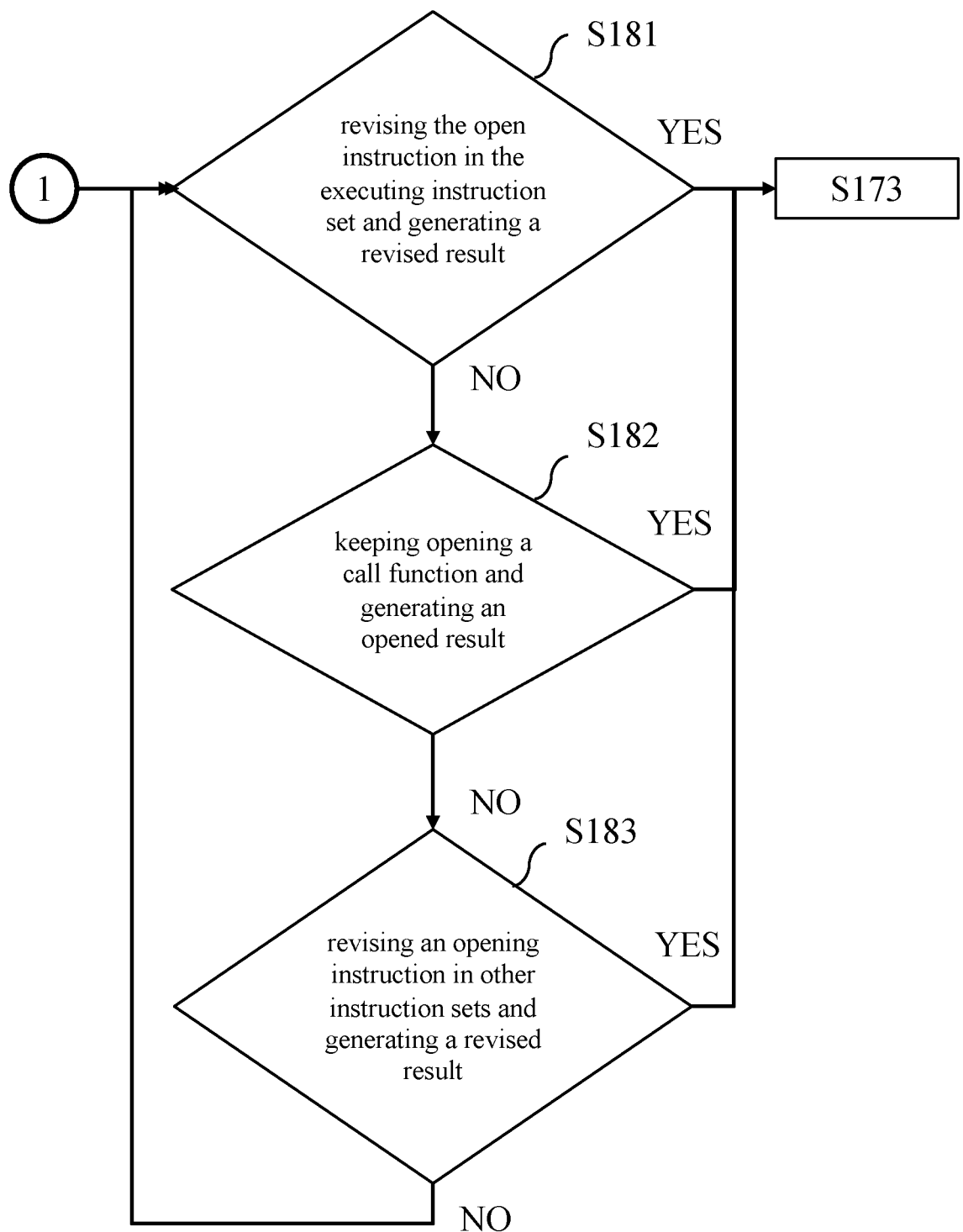

Please refer to FIG. 5, which shows a flow chart (3) of a packet identifying method according to a first embodiment of the present disclosure. If the determination step S172 in FIG. 4 is unsuccessful, that is the opening instruction in the executing instruction set can't open a call function for the IP telephone device 20, then the packet identifying module 12 keeps revising the open instruction in the executing instruction set and generates a revised result, as shown in step S181 in FIG. 5. In addition, the step S181 further determines that if the revised result may open a call function for the IP telephone device 20 successfully? If the determination of S181 is "YES", the flow comes (back) to step S173 (in FIG. 4) for the packet identifying module 12 continuous executing. If the determination of S181 is "NO", the flow comes to step S182: keeping opening a call function for the IP telephone device 20 by using an opening instruction in other instruction sets and generating an opened result. In addition, the step S182 further determines that if the opened result may open a call function successfully? If the determination of S182 is "YES", the flow comes (back) to step S173 (in FIG. 4) for the packet identifying module 12 continuous executing. If the determination of S181 is "NO", the flow comes to step S183: keeping revising an opening instruction in other instruction sets and generating a revised result. In addition, the step S183 further determines that if the revised result may open a call function successfully? If the determination of S183 is "YES", the flow comes (back) to step S173 (in FIG. 4) for the packet identifying module 12 continuous executing. If the determination of S183 is "NO", the flow comes back to step S181, S182, and S183 in order.

In some embodiments, the order of the steps S181-S183 may be varied. Any two steps between S181 to S183 can be changed. For example, the step S182 may be processed first, before the step S181 being processed, and then the step S183 may be processed last. Alternatively, the step S183 may be processed first, before the step S182, and then the step S181 may be the last processed.

In some embodiments, the opening instruction in the database 13 is marked (or determined) as a changed instruction for a call function of the IP telephone device 20. That is, the marked executing instruction set corresponds to (a call function of) the IP telephone device 20.

In some embodiments, any one step in S181, S182, or S183 may open a call function successfully, and the step with successfully opening the call function is marked and saved.

Figure 6:
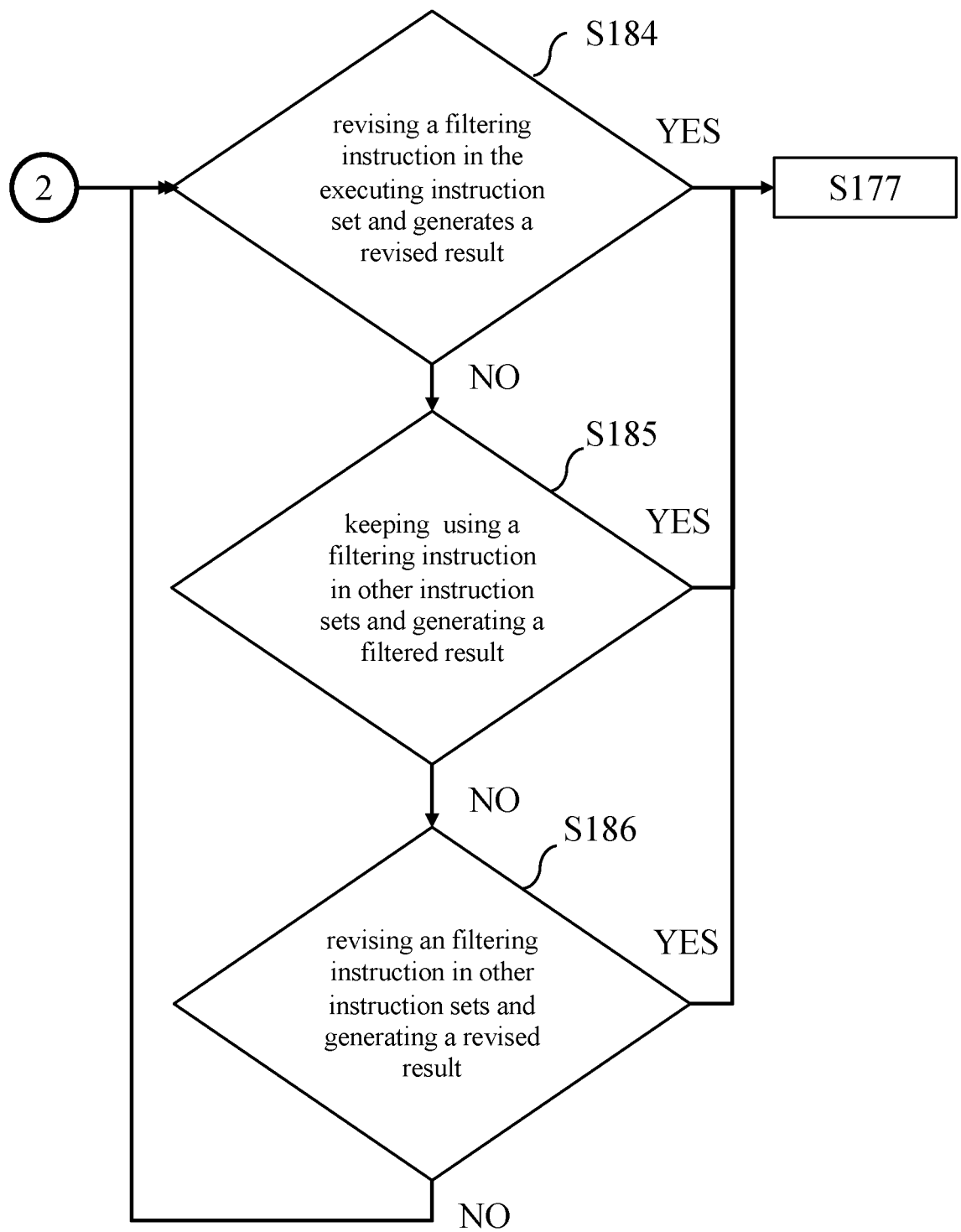

Please refer to FIG. 6, which shows a flow chart (4) of a packet identifying method according to a first embodiment of the present disclosure. If the determination step S176 in FIG. 4 is unsuccessful, that is the filtering instruction in the executing instruction set can't filter a voice packet from one or more packet, then the packet identifying module 12 keeps revising a filtering instruction in the executing instruction set and generates a revised result, as shown in step S184 in FIG. 6. In addition, the step S184 further determines that if the revised result may filter a voice packet from packet(s) successfully? If the determination of S184 is "YES", the flow comes (back) to step S177 (in FIG. 4) for the packet identifying module 12 continuous executing. If the determination of S184 is "NO", the flow comes to step S185: keeping filtering the voice packet from the packet(s) by using a filtering instruction in other instruction sets and generating a filtered result. In addition, the step S185 further determines that if the filtered result may filter a voice packet from packet(s) successfully? If the determination of S185 is "YES", the flow comes (back) to step S177 (in FIG. 4) for the packet identifying module 12 continuous executing. If the determination of S185 is "NO", the flow comes to step S186: keeping filtering the voice packet from the packet(s) by revising a filtering instruction in other instruction sets and generating a filtered result. In addition, the step S186 further determines that if the revised result may filter the voice packet from the packet(s) successfully? If the determination of S186 is "YES", the flow comes (back) to step S177 (in FIG. 4) for the packet identifying module 12 continuous executing. If the determination of S186 is "NO", the flow comes back to step S184, S185, and S186 in order.

In some embodiments, the order of the steps S184-S186 may be varied. Any two steps between S184 to S186 can be changed. For example, the step S185 may be processed first, before the step S184 being processed, and then the step S186 may be processed last. Alternatively, the step S186 may be processed first, before the step S185 being processed, and then the step S184 may be processed last.

In some embodiments, the filtering instruction in the database 13 is marked (or determined) as a changed instruction for a call function of the IP telephone device 20. That is, the marked executing instruction set corresponds to (a call function of) the IP telephone device 20.

In some embodiments, any one step in S184, S185, or S186 may filter a voice packet from one or more packet successfully, and the step with successfully filtering the voice packet is marked and saved.

Figure 7:
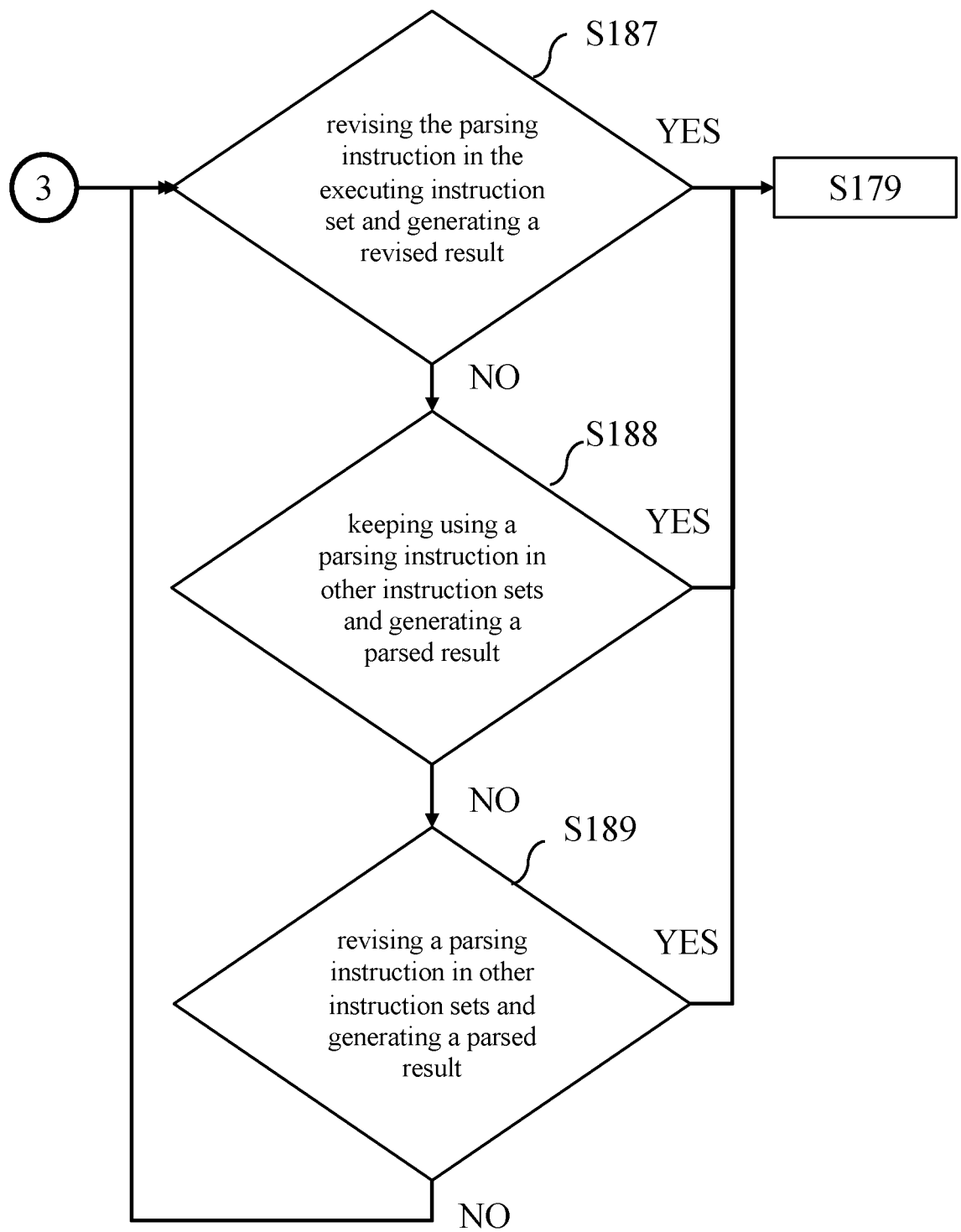

Please refer to FIG. 7, which shows a flow chart (5) of a packet identifying method according to a first embodiment of the present disclosure. If the determination step S178 in FIG. 4 is unsuccessful, that is the parsing instruction in the executing instruction set can't parse a log format of one or more voice packet, then the packet identifying module 12 keeps revising the parsing instruction in the executing instruction set and generates a revised result, as shown in step S187 in FIG. 7. In addition, the step S187 further determines that if the revised result may parse a log format of a voice packet successfully? If the determination of S187 is "YES", the flow comes (back) to step S179 (in FIG. 4) for the packet identifying module 12 continuous executing. If the determination of S187 is "NO", the flow comes to step S188: keeping parsing the log format of the voice packet by using a parsing instruction in other instruction sets and generating a parsed result. In addition, the step S188 further determines that if the parsed result may parse a log format of a voice packet successfully? If the determination of S188 is "YES", the flow comes (back) to step S179 (in FIG. 4) for the packet identifying module 12 continuous executing. If the determination of S188 is "NO", the flow comes to step S189: keeping parsing the log format of the voice packet by revising a parsing instruction in other instruction sets and generating a parsed result. In addition, the step S189 further determines that if the revised result may parse the log format of the voice packet successfully? If the determination of S189 is "YES", the flow comes (back) to step S179 (in FIG. 4) for the packet identifying module 12 continuous executing. If the determination of S189 is "NO", the flow comes back to step S187, S188, and S189 in order.

In some embodiments, the order of the steps S187-S189 may be varied. Any two steps between S187 to S189 can be changed. For example, the step S188 may be processed first, before the step S187 being processed, and then the step S189 may be processed last. Alternatively, the step S189 may be processed first, before the step S188 being processed, and then the step S187 may be processed last.

In some embodiments, the parsing instruction in the database 13 is marked (or determined) as a changed instruction for a call function of the IP telephone device 20. That is, the marked executing instruction set corresponds to (a call function of) the IP telephone device 20.

In some embodiments, any one step in S187, S188, or S189 may parse a log format of a voice packet successfully, and the step with successfully parsing the log format is marked and saved.

Figure 8:
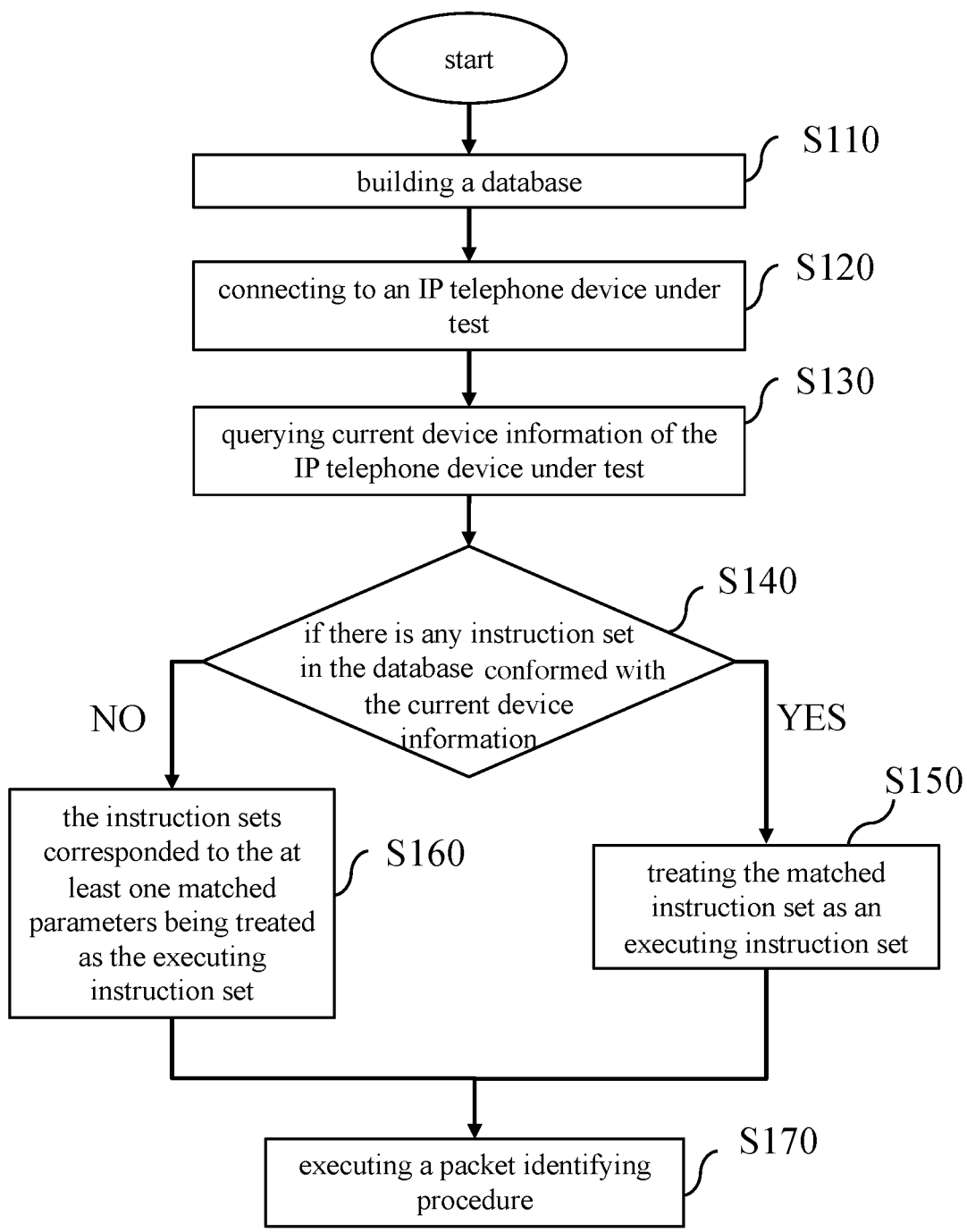
FIG. 8 is a flow chart of a packet identifying method according to another embodiment of the present disclosure.

Please refer to FIG. 8, which is a flow chart of a packet identifying method according to a second embodiment of the present disclosure. FIG. 8 is similar to FIG. 3, and the difference is the step before step S120. Before the step S120, it builds a database, as shown in step S110 (FIG. 8). Below will describe with the difference and omit the same steps.

First, a database 13 is built. The database 13 includes a plurality of instruction set, and each instruction set corresponds to existing device information of one or more IP telephone device 20, as shown in step S110.

In some embodiments, after building a database 13, it may query the existing device information of the IP telephone device under test and its instruction set by connecting to the IP telephone device. The existing device information of the IP telephone device under test and its instruction set are received by the communication interface 11 and saved in the database 13, so as to update the existing device information and its instruction set in the database 13. For example, after the packet identifying module 12 connecting to the IP telephone device under test, one or more instruction set corresponding to the existing device information by be called out by using a calling instruction. In some embodiments, after building a database 13 at the first, it may build another database 13 in the next time when executing the packet identifying method. In other words, every time when executing the packet identifying method, a new database 13 may be required to be built in addition to the previous database 13. In some embodiments, the packet identifying module 12 may process the step S110 (building a database 13) after the step S120 and before the step S140.

According to the one or more embodiments of the packet identifying device 10 and the packet identifying method as described above, it may execute a packet identifying procedure by using an executing instruction set after receiving one or more current device information, so as to find an instruction set corresponding to the IP telephone device 20. Next, one or more packet in the IP telephone device 20 may be captured according to the instruction set. A log format of one or more packet may be parsed successfully. Accordingly, it determines (or marks) an IP telephone device 20 that is corresponding to the executing instruction set.

What is claimed is:

1. A packet identifying method used for one or more IP telephone devices, each IP telephone device having existing device information, each existing device information being corresponding to an instruction set, each instruction set being stored in a database of a packet identifying device, the method comprising:
   connecting to IP telephone device under test and querying current device information of the IP telephone device under test;
   determining if there is any instruction set in the database conformed with the current device information;
   executing a packet identifying procedure by an executing instruction set when the determination is "yes", wherein a conformed instruction set is used as the executing instruction set; and comparing the current device information with the existing device information for finding at least one matched parameter when the determination is "no", and executing the packet identifying procedure, wherein the instruction sets corresponding to the at least one matched parameter are used as the executing instruction set, and the at least one matched parameter comprises at least one of hardware information and software information.

2. The packet identifying method of claim 1, wherein the packet identifying procedure comprises parsing a packet by using a parsing instruction in the executing instruction set, and wherein the database marks that the executing instruction set is corresponding to the IP telephone device under test when a log format of the packet is parsed successfully.

3. The packet identifying method of claim 2 comprising:
keeping revising the parsing instruction when the log format of the packet is parsed unsuccessfully, wherein the revised parsing instruction is used to parse the packet.

4. The packet identifying method of claim 2 comprising:
keeping parsing the packet by using a parsing instruction in other instruction set when the log format of the packet is parsed unsuccessfully.

5. The packet identifying method of claim 2 comprising:
keeping revising the parsing instruction in other instruction set when the log format of the packet is parsed unsuccessfully, wherein the revised parsing instruction is used to parse the packet.

6. The packet identifying method of claim 1, wherein the packet identifying procedure comprises building a call communication for the IP telephone device under test by using a calling instruction in the executing instruction set, and wherein the database marks that the executing instruction set is corresponded to a call function of the IP telephone device under test when a voice packet is parsed from a plurality of packet in the call communication successfully.

7. The packet identifying method of claim 6 comprising:
keeping revising the calling instruction when the voice packet is parsed from the packets unsuccessfully, wherein the revised calling instruction is used to parse the voice packet from the packets.

8. The packet identifying method of claim 6 comprising:
keeping parsing the voice packet from the packets by using the calling instruction in other instruction set when the voice packet is parsed from the packets unsuccessfully.

9. The packet identifying method of claim 6 comprising:
keeping revising the calling instruction in other instruction set when the voice packet is parsed from the packets unsuccessfully, wherein the revised calling instruction is used to parse the voice packet from the packets.

10. The packet identifying method of claim 1, wherein the current device information and the existing device information respectively includes a plurality of parameters, the determination is "yes" if the parameters of the existing device information corresponding to the conformed instruction set respectively conform with that of the current device information, and the determination is "no" if a part of the parameters of the existing device information corresponding to a non-conformed instruction set respectively conforms with that of the current device information and the others of the parameters do not conform with that of the current device information, wherein the non-conformed instruction set are used as the executing instruction set while executing the packet identifying procedure.

11. A packet identifying device used for one or more IP telephone device, each existing IP telephone device corresponding to an instruction set, each instruction set corresponding to existing device information, the existing device information comprising hardware information, software information, and a combination of hardware information and software information, and the packet identifying device comprising:

a communication interface for receiving a current device information corresponding to at least one IP telephone device under test and a plurality of the instruction sets; and a packet identifying module for determining if the current device information conforms with one of the plurality of the instruction set; wherein if the determination is "yes", a conformed instruction set is used as an executing instruction set for executing a packet identifying procedure; and if the determination is "no", the current device information is compared with the existing device information for finding at least one matched parameter in the plurality of the instruction sets, so as to use the plurality of the instruction sets corresponding to the at least one matched parameter as the executing instruction set for executing the packet identifying procedure.

* * * * *